United States Patent [19]

Maeda et al.

[11] Patent Number: 5,050,014
[45] Date of Patent: Sep. 17, 1991

[54] MAGNETIC RECORDING APPARATUS FOR CORRECTING THE ABSOLUTE TRACK POSITION

[75] Inventors: Yutaka Maeda; Kiyotaka Kaneko; Izumi Miyake; Yoshio Nakane; Hiroshi Shimaya, all of Tokyo, Japan

[73] Assignee: Fuji Photo Film, Ltd., Kanagawa, Japan

[21] Appl. No.: 326,685

[22] Filed: Mar. 21, 1989

[30] Foreign Application Priority Data

Mar. 22, 1988 [JP] Japan ................................. 63-65632

[51] Int. Cl.$^5$ ............................................ G11B 21/02
[52] U.S. Cl. .................................. 360/75; 360/77.04; 360/77.06; 360/78.04; 358/906
[58] Field of Search .................... 360/35.1, 75, 77.04, 360/77.06, 78.04, 78.13, 77.07–77.11, 13, 14.1; 358/906, 909

[56] References Cited

U.S. PATENT DOCUMENTS

| 4,445,153 | 4/1984 | Fujimoto et al. | 360/77.06 |
| 4,800,448 | 1/1989 | Kaneko et al. | 360/35.1 |
| 4,825,324 | 4/1989 | Miyake et al. | 360/35.1 |

OTHER PUBLICATIONS

IBM TDB, vol. 19, No. 6, "Self Calibrating Disk Storage Apparatus", Griffiths et al., 11/76, pp. 1991-1992.

Primary Examiner—Vincent P. Canney
Assistant Examiner—Steven R. Garland

[57] ABSTRACT

Positioning of a magnetic head for recording a signal on a magnetic recording medium is performed in accordance with an absolute track address system. However, due to mechanical errors, expansion or contraction of the magnetic recording medium caused by changes in temperature or humidity, or small variations between recording apparatuses, a deviation can occur between a position recorded on in the past and a absolute track position thereof. Accordingly, with regard to at least one track that has already been recorded on, the amount of deviation between the peak position of the envelope of a signal on this track and an absolute track position is measured. Then, based upon the measured amount of deviation, the position at which the magnetic head is stopped on the track to be recorded on next is corrected.

14 Claims, 5 Drawing Sheets

MAGNETIC RECORDING APPARATUS FOR CORRECTING THE ABSOLUTE TRACK POSITION

BACKGROUND OF THE INVENTION

1. Field of the Invention

This invention relates to a recording apparatus for recording on a rotating magnetic recording medium. More particularly, the invention relates to a magnetic recording apparatus such as an electronic still camera of the type in which a subject is imaged by a solid-state image pick-up device such as a CCD and a video signal representing the image is recorded on a magnetic disk, by way of example. The magnetic recording apparatus referred to in this specification is intended to cover a recording/playback apparatus capable of recording and playback, and a magnetic recording apparatus having a playback function.

2. Description of the Related Art

Recording on a rotating magnetic recording medium by a magnetic head is performed by positioning the center of the magnetic head on the absolute track position of a track on which the recording is about to be made. This is referred to as a so-called "absolute track address method". Transferring the magnetic head to the absolute track position is performed upon adopting a predetermined position (a reference position) as a reference. This reference position is not a position provided on the magnetic recording medium as by marking but this reference position is mechanically determined on the side of the magnetic recording apparatus.

The magnetic recording medium expands and contracts due to environmental changes, particularly changes in temperature, humidity and the like. Accordingly, the position on the magnetic recording medium that corresponds to the abovementioned reference position also changes with changes in the environment and, hence, so does the recording position on the magnetic recording medium. In addition, there are occasions where the recording position shifts due to an error in the mechanism of the magnetic recording apparatus. There are also slight differences between magnetic recording apparatuses so far as the mechanisms thereof are concerned. Consequently, situations can arise in which the spacing between the recording position of a track previously recorded on and the recording position of another track on which a recording is to be made now will deviate from the normal spacing between the tracks on one and the same magnetic recording medium. In any case, it is desired that recording be performed at a position which maintains the normal track-to-track spacing relative to a previously recording track to the greatest degree possible.

The deviation in the absolute track position mentioned above can cause recorded signals to be superimposed in a case where recording is performed on a track located between recorded tracks on both sides thereof. Also, when a desired track is to be erased, the aforementioned deviation can cause part of a neighboring track to be erased.

SUMMARY OF THE INVENTION

An object of the invention is to provide a magnetic recording apparatus in which the absolute track position can be corrected upon taking into account, at all times, expansion and contraction of a magnetic recording medium due to environmental changes, mechanical error and variations in one apparatus from another, and in which such problems as overlapping of recorded signals and erroneous erasure of a part of a neighboring track can be prevented from occurring.

According to an embodiment of the present invention, the foregoing object is attained by providing a magnetic recording apparatus comprising a head feed device for feeding a magnetic head diametrically of a rotating magnetic recording medium, an envelope detecting circuit for detecting an envelope of a read signal obtained from the magnetic head, peak position detecting means for detecting a peak position of an envelope, position deviation detecting means for detecting an amount of deviation from a peak position of an envelope of a signal, which has been recorded on at least one predetermined track, from an absolute track position of this track, and positioning control means for correcting a position at which the magnetic head stops on this track by using the amount of deviation.

In accordance with the invention, a reference position determined by the mechanism of the magnetic recording apparatus or an absolute track position is corrected by using the position of a signal that has actually been recorded on a recorded track. Specifically, the peak position of an envelope of a recorded signal on a recorded track is detected and the amount of displacement of the peak position from the absolute track position of this track is set. At the time of recording (or erasure), the amount of deviation is used to correct the position at which the magnetic head is to be positioned.

Since the position at which a recording is to be made is corrected using the position of a signal actually recorded on the magnetic recording medium, recording can be performed at a position coordinated with the recorded track on the magnetic recording medium. This makes it possible to substantially eliminate recording position errors due to expansion and contraction of a magnetic recording medium caused by environmental changes, mechanical errors and differences between apparatuses. Recorded signal overlapping can also be prevented even if recording is to be performed between tracks that have already been recorded on. Furthermore, since it is possible to control the transfer of the magnetic head at erasure in such a manner that the head will not overlap a position recorded on a neighboring track, accidental erasure of the signal recorded on the neighboring track is eliminated.

Hereinafter an embodiment will be described in which the present invention is applied to a still video camera having a playback function.

Other features and advantages of the present invention will be apparent from the following description taken in conjunction with the accompanying drawings.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a view illustrating the relationship between the positions of recorded tracks and the position of a magnetic head correctly positioned upon taking an amount of deviation into account; and, FIG. 6 is a flowchart illustrating a processing procedure for positioning the magnetic head upon detecting the peak positions of recorded tracks on both sides of a track about to be recorded on.

DESCRIPTION OF THE PREFERRED EMBODIMENTS

Figure 1:
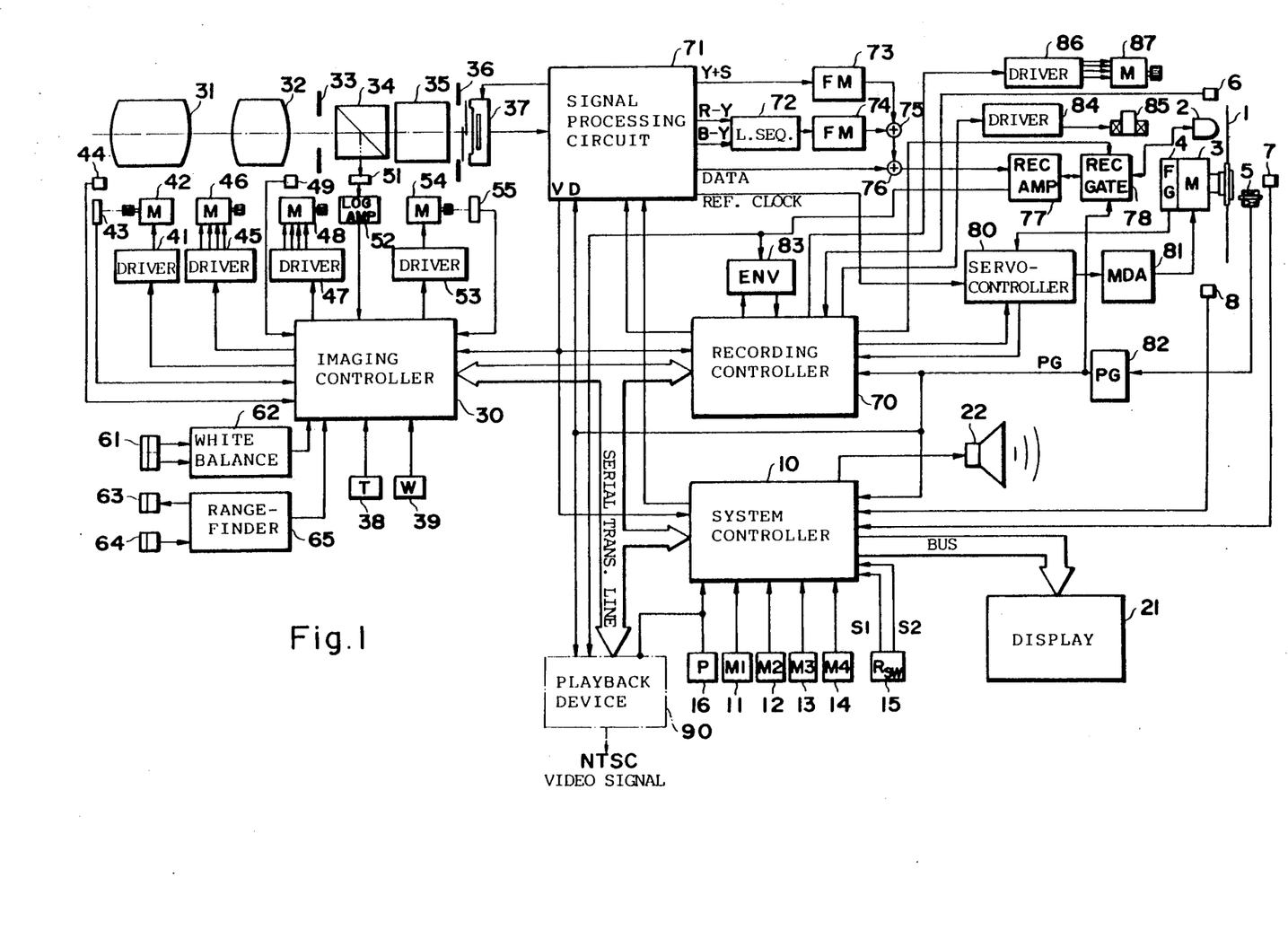
FIG. 1 is a block diagram illustrating the system configuration of a still video camera.

FIG. 1 illustrates the construction of a still video camera system.

This still video camera is controlled by three controllers, namely a system controller 10, an imaging controller 30 and a recording controller 70. Each of the controllers 10, 30 and 70 includes a CPU (e.g., a microprocessor), memories (a RAM, ROM, etc.) for storing the program executed by the CPU as well as the necessary data, and the required interface circuit. The CPU of the system controller 10 is a main CPU for controlling the overall operation of the still video camera. The CPUs of the imaging controller 30 and recording controller 70 are subordinate CPUs, which operate in accordance with commands from the main CPU. The imaging controller 30 performs the controls related to such photographic functions as focusing, f-stop, shutter speed and zoom. The recording controller 70 performs the controls related to drive of a disk motor 3, loading/unloading of a magnetic head 2, feed of the magnetic head 2 and the recording of still video signals on a video floppy (magnetic disk) 1. The controllers 10, 30 and 70 are interconnected by a serial transmission line and communicate at a predetermined timing.

A playback device (playback adapter) 90 can also be connected. The playback device 90 demodulates a still video signal read out from the video floppy 1, converts the signal into a color still video signal in the NTSC format, for example, and outputs the converted signal. The playback device 90 also includes a CPU and a memory. This CPU is positioned as a subordinate CPU with respect to the main CPU.

A still video camera is provided with a bucket which can be freely opened and closed. The video floppy 1 is inserted into the opened bucket. When the bucket is subsequently closed, the video floppy 1 is chucked onto the spindle of the disk motor 3.

Figure 2:
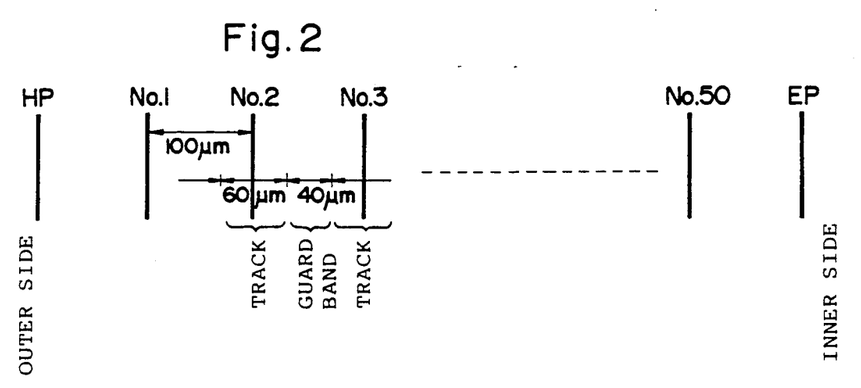
FIG. 2 is a view ilustrating the arrangement of tracks on a video floppy.

As illustrated in FIG. 2, the video floppy 1 is provided with a plurality (e.g. 50) of concentric, circular tracks. (By way of example, the track pitch is 100 $\mu$m, the track width is 60 $\mu$m, and the guard band width is 40 $\mu$m.) By imaging processing, one field or frame of a frequency-modulated color still video signal (inclusive of a luminance signal and a color difference signal, etc.) is magnetically recorded on one or two tracks. The 50 concentric, circular tracks provided on the magnetic recording surface of the floppy disk 1 are numbered consecutively from No. 1 to No. 50 from the outer to the inner side thereof. A home position HP (an origin position or a standby position) is located on the outer side of Track No. 1, and an end position EP is situated on the inner side of Track No. 50. The distance from the home position HP to the center of track No. 1 is equal to the track pitch (100 $\mu$m).

Applied as inputs to the system controller 10 are switch input signals from a power supply switch 16, various mode switches 11–14 and, a shutter release button 15, a detection signal from a bucket switch 7, which detects whether the bucket for accommodating the video floppy 1 is open or closed (and, if necessary, whether or not the video floppy is present within the bucket), and a detection signal from a condensation sensor 8 which measures the humidity near the location at which the video floppy 1 is loaded. Modes which can be set include a frame/field mode indicative of frame recording or field recording, a skip mode for providing the video floppy with blank tracks on which a recording is not made, and an edit mode for performing recording on the blank tracks. The set modes, the track numbers which are to be recorded on and other information are displayed on a liquid crystal display device 21. The display device 21 is connected to the system controller by a bus. When condensation or some other abnormality occurs, a buzzer 22 is sounded. It is also permissible for the display device 21 to display the fact that condensation has been detected.

The shutter release button 15 is a two-stage stroke type. A switch S1 is closed by pressing the button 15 over the first stage of its stroke, and a switch S2 is closed by pressing the button 15 over the second stage of its stroke. The disk motor 3 is driven into operation when the switch S1 is closed, and both imaging and recording are performed when the switch S2 is closed.

The imaging optical system includes a zoom lens system 31, an imaging lens system 32 for forming the image of a subject, a diaphragm 33, a beam splitter 34 for deflecting part of an incident light beam so that this part of the beam will impinge upon a photometric element 51, an infrared shielding filter 35, and a shutter 36. An illumination detection signal from the photometric element 51 is inputted to the imaging controller 30 via a logarithmic amplifier 52. The imaging controller 30 is operative to perform processing for calculating an f-stop value and a shutter speed based on the intensity of illumination of the incident light detected by the photometric element, control the diaphragm 33 based on the f-stop value decided, and control the opening and closing of the shutter 36 based on the shutter speed decided. The opening and closing of the diaphragm 33 is carried out by a diaphragm motor 48 driven by a driver 47. Also provided is a switch 49 for detecting opening and closing limit positions of the diaphragm 33. Latch release of the front and rear curtains of the shutter 36 and wind-up thereof are executed by a shutter drive unit which includes a shutter motor 54 driven by a driver 53. The angle of rotation of the motor 54 is detected by a rotary encoder 55 and fed back to the controller 30.

A color detection signal from a color sensor 61 is fed into the controller 30 after being subjected to predetermined processing by a white-balance processing circuit 62. The white-balance data is used in order to control the amplification gain of R, G and B signals in a variable-gain amplifier circuit, as described below, of a signal processing circuit 71.

In order to measure the range to the subject, an infrared light-emitting diode 63 and a light-receiving element 64 for receiving the reflected light are provided. Data indicative of range to the subject is obtained by a rangefinding circuit 65 based on the output signal from the light-receiving element 64. An auto-focusing motor 46 is driven via a driver 45 under the control of the controller 30 by using the range data, whereby focusing control is performed.

In response to signals from a telephoto switch 38 and a wide-angle switch 39 that are for inputting the degree of zoom, a motor 42 is driven by the controller 30 via a driver 41 to set a prescribed zoom magnification. The angle of rotation of the motor 42 is detected by a rotary encoder 43 and fed back to the controller 30.

Disposed in the focal plane of the imaging optical system is a solid-state electronic image pick-up device 37, for the three primary colors including a two-dimensional image pick-up cell array of CCDs for example. Image data stored in the image pick-up device 37 when the shutter 36 opens is read out as a serial still video signal (R,G, and B) in synchronization with vertical and horizontal synchronizing signals provided by a signal processing circuit 71. This serial signal is fed into the signal processing circuit 71.

The signal processing circuit 71 includes an oscillator circuit from the output signal of which a vertical reference signal VD and a reference clock signal are formed and outputted. The vertical reference signal VD is applied to the system controller 10, the imaging controller 30 and the recording controller 70 to serve as a reference for the operation timing of each of these devices. The reference clock signal is applied to a servo-control circuit 80. As will be described below, a phase pulse PG which represents the reference phase of rotation of the video floppy 1 is applied to the signal processing circuit 71, the system controller 10, the recording controller 70 and the playback device 90. In response to a reset signal from the recording controller 70, the signal processing circuit 71 adjusts the vertical reference signal VD in such a manner that a constant phase relation with regard to the phase pulse PG is maintained. In addition, the signal processing circuit 71 generates the vertical and horizontal synchronizing signals, which possess a constant phase relation with regard to the phase pulse PG.

Further, the signal processing circuit 71 is equipped with a preamplifier circuit to which the still video signal (R,G and B) is applied, a variable-gain amplifier circuit (a white-balance adjusting circuit) and a process matrix circuit. A luminance signal Y (on which a synchronizing signal S is superposed) and two color difference signals R-Y and B-Y are formed within the process matrix circuit. These color difference signals R-Y and B-Y are line-sequenced every 1H by a line sequencing circuit 72. The luminance signal Y and the line-sequenced color difference signal are directed through pre-emphasis circuits (not shown) and then applied to frequency modulator circuits 73 and 74, where the signals are frequency modulated at respective frequency bands which differ from each other. The resulting frequency-modulated signals are combined in a mixing circuit 75.

It is possible for additional information to be recorded on tracks of the floppy disk 1. The additional information mentioned here refers to an audio signal (which represents a voice for narration, music, etc.) and a display signal (which represents character information for example). This additional information signal enters the signal processing circuit 71 from a microphone or another input device (not shown) to be converted into a predetermined format before being delivered to the line for the luminance signal Y. There are also cases where the additional information signal is superposed on the luminance siganl Y. In a case where only the additional information signal is recorded on a predetermined track of the video floppy 1, this signal alone will be outputted.

It is possible to perform multiplexed recording of data on the video floppy 1. The multiplexed recorded data includes an initial bit, field/frame data, track address (No.) data, date data and data employed by the user. These items of data, which are provided by the system controller 10, are DPSK (differential phase shift keying)-modulated by the signal processing circuit 71 and are combined along with the abovementioned frequency-modulated video signal in the mixing circuit 76. The resulting signal is fed into a recording amplifier circuit 77.

The magnetic head 2 (two are provided at a spacing which positions the two heads at mutually adjacent tracks so as to make frame recording possible), which is for writing the still video signal of the imaged subject on a predetermined track of the video floppy 1, is supported so as to be freely movable diametrically of the floppy disk 1, and is controlled so as to be fed in the same direction, by a feed drive controller. The latter includes a stepping motor 87 and a driver 86. The recording controller 70 provides the feed drive controller with instructions regarding the feeding direction and the amount of feed of the magnetic head 2. Also provided is a home position switch for detecting that the magnetic head 2 has arrived at the home position HP. The detection signal from the switch 6 is applied to the recording controller 70. It will be understood from the foregoing that the home position HP is a position stipulated by the detection position of the home position switch 6 provided in the still video camera. The arrangement is not one in which any kind of an indication provided on the video floppy 1 is detected and the position of the indication adopted as the home position.

A head loading device is provided in order to prevent the floppy disk 1 from becoming scarred due to prolonged contact between the magnetic head 2 and the magnetic disk 1 when the latter is at rest. Under the control of the recording controller 70, the head loading device, which includes a head loading solenoid 85 and its driver 84, displaces (advances and retracts) the magnetic head 2 in such a manner that the magnetic head 2 contacts the video floppy 1 only at recording or playback (when the video floppy 1 is rotating) or only when power is being introduced, and separates from the video floppy 1 at all other times.

In order to provide good contact between the magnetic head 2 and the rotating video floppy 1, a regulating plate (not shown) is provided on the side of the video floppy opposite the magnetic head 2. Disposed adjacent the core of the video floppy 1 is a phase detector 5 which, by detecting the leakage flux from a permanent magnet for chucking purposes, senses when the video floppy 1 has arrived at a predetermined angular position, whereupon the detector 5 outputs a phase detection signal. The output detection signal of the phase detector 5 has its waveform shaped by a phase pulse generating circuit (waveform shaping circuit) 82, which delivers the signal as the phase pulse PG. This pulse is applied to the controllers 10, 70 and 90, the circuit 71 and a recording gate circuit 78, as mentioned above. One of the phase pulses PG is generated whenever the video floppy 1 makes one revolution.

The disk motor 3 is driven by its driver 81. The rotational speed (rpm) of the disk motor 3 is detected by a frequency generator 4, which outputs a detection signal whose frequency is proportional to the rotational speed of the motor 3. This signal enters the servo-control circuit 80. Based on the reference clock signal which enters from the signal processing circuit 71 and the frequency detection signal which enters from the detector 4, the servo-control circuit 80 controls the motor 3 so that the motor 3 will rotate at a constant speed (e.g., 3,600 rpm). The servo-control circuit 80 also starts and stops the motor 3 in accordance with a command from the recording controller 70.

The still video signal amplified by the recording amplifier circuit 77 enters the recording gate circuit 78. When a record command is issued by the recording controller 70, the recording gate circuit 78 is opened at the timing of the phase pulse PG applied thereto and remains open until the next phase pulse PG is entered. As a result, the video signal and the like are applied to the magnetic head 2 to record a still video signal, etc., on a predetermined track of the video floppy 1. This recording is performed for only one revolution of the video floppy 1. This is for the case where field recording is carried out. In the case of frame recording, the gate circuit 78 is opened for two revolutions of the video floppy 1. A video signal of a first field is recorded on a certain track by one head 2 in the first revolution of the video floppy 1, and a video signal of a second field is recorded on the neighboring track by the other head 2 in the second revolution of the video floppy 1.

It is also possible for the magnetic head 2 to play back a video signal or the like from the video floppy 1. A frequency-modulated video signal or the like read from the magnetic head 2 is similarly amplified by the amplifier circuit 77 via the gate circuit 78 and then applied to an envelope detector circuit 83 and the playback device 90. This playback signal is employed not just in the playback mode but also in the track search processing of the recording mode, and in the magnetic head positioning processing of the editing mode.

The envelope detector circuit 83 detects the envelope of the read signal from the magnetic head 2, namely the envelope of the frequency-modulated video signal recorded on a track of the video floppy 1, and outputs a voltage signal conforming to the detected envelope. The circuit includes an A/D (analog/digital) converter, which converts the voltage signal representing the envelope into a digital quantity, namely an eight-bit digital signal representing a quantization level of, e.g., 256. This digital signal is fed into the recording controller 70.

The envelope detection signal is used so that the recording controller 70 may determine whether a video track on the video floppy 1 is blank or already recorded on (this is referred to as track search processing). If the level of the detection signal does not attain a predetermined threshold when the magnetic head 2 is fed across a track, that track is blank. If the threshold level is attained, on the other hand, this means that the track has already been recorded on.

The envelope detection signal is used also in processing for detecting the peak position of an envelope at a recorded track. Peak position detection processing entails transferring the magnetic head 2 across the tracks and detecting a position at which the detected signal level exhibits a maximum value. As will be understood from the detailed description given below, peak position detection processing is utilized in track search processing and is employed in magnetic head positioning processing in the editing mode. Peak position detection processing is also utilized in order to position the magnetic head 2 at the envelope peak position of the recorded track in the playback mode.

If necessary, the envelope detection signal may be used in recording check processing as well. Recording check processing refers to a check for determining whether a recording has indeed been made after an imaged video signal is recorded on a predetermined track by the magnetic head 2 in the manner described above. A decision is rendered to the effect that a recording has been made when the envelope detection signal is above a predetermined threshold level.

Recording of a still video signal or the like on a predetermined track of the video floppy 1 is carried out by positioning the magnetic head on the track in accordance with the absolute track address method. As illustrated in FIG. 2, the absolute track address method refers to a method of determining the center position of each track (this position is referred to as the absolute track position) by the distance from the home position HP (the reference position). At the time of recording, the magnetic head 2 is positioned in such a manner that the center of the magnetic head 2 coincides with the absolute track position of the track to be recorded on.

As described above, the home position HP is decided by the position of the home position switch 6 provided on the still video camera. The absolute track position of each track is decided by the amount the magnetic head 2 is fed by a magnetic head feed drive control device, which includes the stepping motor 87. Accordingly, the home position HP and the absolute track position of each track tend to be affected by the mechanical error in the still video camera and variations between still video cameras. The video floppy 1 expands and contracts due to environmental changes such as changes in temperature and humidity. Therefore, even if the positioning of the magnetic head 2 in the still video camera is correct, the position on the video floppy 1 relative to the magnetic head 2 is changed by the environment.

Figure 3:
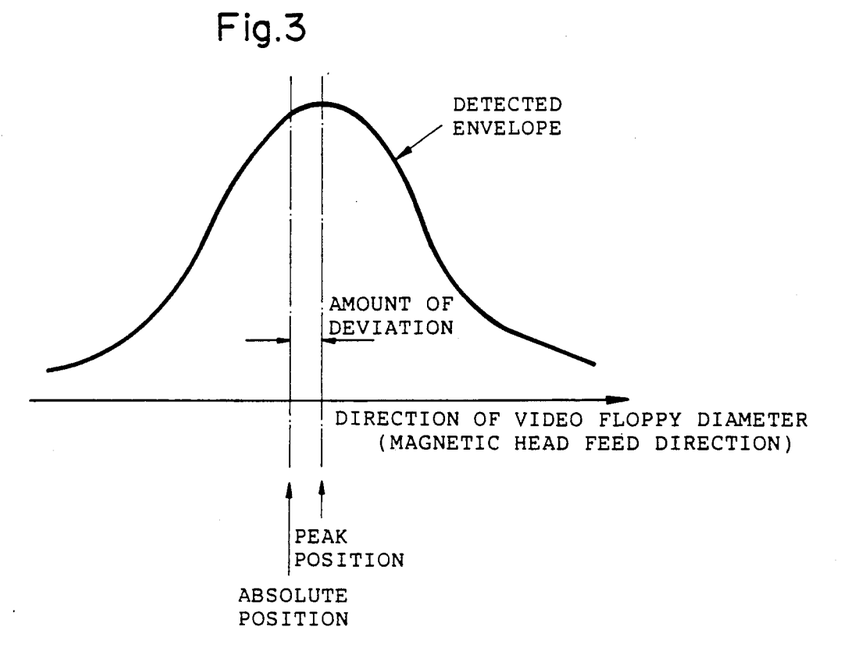
FIG. 3 is a view useful in describing an amount of deviation and illustrates an example of an envelope of a signal read from a recorded track.

Accordingly, in the present embodiment, in a case where there is a track on the video floppy 1 on which a recording has been made in the past by the same or a different still video camera, use is made of the difference [i.e., an "amount of deviation" (see FIG. 3)] between the absolute position of a recorded track (hereinafter referred to as a reference track) determined in the still video camera in which the video floppy has been loaded, and the peak position of the envelope of a signal read from this recorded track. By using this deviation, a correction is applied to the positioning of the magnetic head that is to be positioned on the absolute track position of another track. It will suffice if the processing for detecting the amount of deviation at the reference track is carried out at any time prior to recording on a blank track. A typical method of performing this will now be described.

(1) The amount of deviation is detected in a track search and the amount detected is stored in memory.

In general, the track search is performed when a video floppy is loaded or changed. The track search involves processing for determining, with regard to every track on the newly loaded or changed video floppy, whether the track has been recorded on or is blank, and preserving the results of the determination in a memory in the form of a track map. By referring to the track map, it is possible to discriminate blank tracks on which imaged still video signals can be recorded.

Though any recorded track can be adopted as a reference track, typically recorded tracks of the following kind can be used:

(1-1) a recorded track which appears first in track search processing; and (1-2) a recorded track which appears last in track search processing.

(2) The amount of deviation in a recorded track neighboring a track to be recorded on is detected whenever recording processing is executed.

This is effective particularly in the above-described editing mode. In the editing mode, often a track neighboring the track on which a recorded is to be made has already been recorded on, and in some cases the tracks on both sides have already been recorded on. Accordingly, if the positioning of the magnetic head is inappropriate, there is the danger that recording will be carried out in a manner which partially overlaps a signal recorded on a neighboring track. In principle, therefore, the magnetic head is positioned at a position intermediate the peak positions of the tracks neighboring a given track on both sides thereof.

Figure 4:
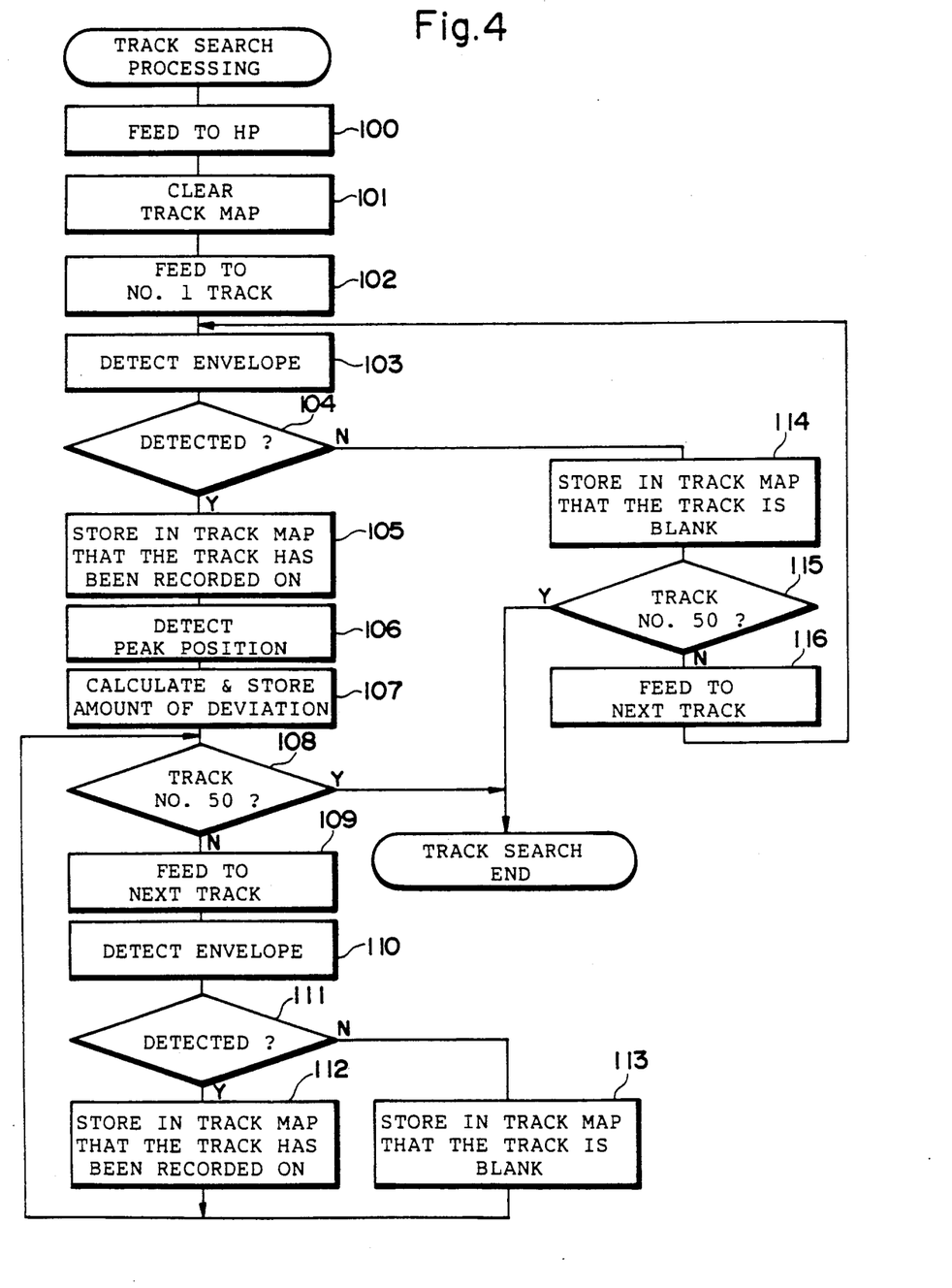
FIG. 4 is a flowchart illustrating a processing procedure for detecting an amount of displacement at the time of a track map fabrication.

Also, when erasure is performed, a portion of a signal on a neighboring recorded track may be erased if the magnetic head positioning is unsuitable. Accordingly, the method mentioned in (2) above should be used in the erasing processing. FIG. 4 illustrates method (1) mentioned above, namely processing for detecting the amount of deviation when the track map is created. The first recorded track mentioned in (1-1) above is employed as the reference track. This processing is executed by the recording controller 70 under a command issued by the system controller 10.

As set forth above, track search processing is carried out when a video floppy is loaded or when one video floppy is exchanged for another. This is determined by a detection signal from the bucket switch 7. It is preferred that the presence of the video floppy in the bucket be verified. There are instances where the bucket is opened and closed to change or load a video floppy when the main power supply of the still video camera is off. In order to deal with such a situation, it is preferred for the opening and closing of the bucket to be detected and for this condition to be stored in advance electrically or mechanically. Then, when the main power supply is turned on, it is determined whether the opening and closing of the bucket has been memorized. If it has been memorized, track search processing is executed.

First, a check is performed to see whether the magnetic head 2 is at the home position HP. If the magnetic head 2 is not at the home position HP, then the magnetic head 2 is fed to the home position at step 100 of the flowchart. Next, the track map relating to a video floppy previously loaded in the camera is cleared from the memory of the recording controller 70 (and the system controller 10) at step 101. It is permissible to perform this clearing processing at the opening/closing of the bucket. This is followed by step 102, at which the magnetic head 2 is transferred from the home position HP to the No. 1 track. The distance of head transfer is decided by the number of shift pulses applied to the pulse motor 87.

Step 103 calls for envelope detection to be performed at the track to which the head has been fed. If the envelope detected exceeds a predetermined threshold level, the particular track is judged to be a recorded track. Data to the effect that this track has been recorded on is stored in a corresponding fashion on the track map (steps 104 and 105).

If an envelope is not detected or the detected envelope is less than the threshold level, data to the effect that this track is blank is stored in the track map at step 114. (If a cleared track in the track map is judged to be blank, this processing need not necessarily be performed.) If the track is blank, the magnetic head 2 is fed until an envelope is detected at a radially inward neighboring track (steps 114, 115 and 116). If an envelope is not detected at any of the tracks (YES at step 115), then track search processing ends.

If it is found in track search processing that a recording has been made, then peak position detection processing is executed (step 106) at the first track judged to have been recorded on (this is the aforementioned reference track). The difference between the peak position at this reference track and the absolute track position, namely the aforementioned amount of deviation, is measured and stored in the memory of unit 70 at step 107.

It is subsequently determined at step 108 whether the track at which the magnetic head 2 is positioned is track No. 50. If this track is not track No. 50, then the magnetic head 2 is fed next radially inward neighboring track and envelope detection processing is executed (steps 109 and 110). If the detected envelope exceeds the predetermined threshold level, then the particular track is judged to be a recorded track and data to this effect is set at the storage location of this track in the track map (steps 111 and 112). If the detected envelope is less than the threshold level (NO at step 111), then this track is judged to be a blank track and data to this effect is set in the track map at step 113.

At the steps (108, 109, 110, 111, 112 and 113) which follow detection of peak position at step 106 and detection of the amount of deviation at the reference track, it is preferred that for the feed of the magnetic head 2 to be performed upon taking the detected amount of deviation into account.

The foregoing processing is perforemd with regard to all of the remaining tracks. When the magnetic head 2 arrives at track No. 50 and the processing regarding this track ends (YES at step 108), then track search processing is terminated.

A track map for a new video floppy is thus created. The track map is preserved in the memory of the recording controller 70 and, if necessary, is transferred to the system controller 10. The track map is updated when recording is performed on a blank track of the video floppy 1, and when a recorded track is erased.

If a detected amount of deviation has been stored, in recording processing after creation of the track map, the magnetic head 2 is positioned and recording is carried out upon taking the amount of deviation into account, namely upon offsetting the magnetic head from the absolute track position of the blank track in the direction of the deviation by the amount of the deviation. It is permissible to offset the location of the home position HP by the amount of the deviation in advance. The set amount of deviation is preserved in memory until opening of the bucket is sensed by the bucket switch 7, or until the recording controller 70 is reset. The amount of deviation is erased when the bucket is opened and when the recording controller 70 is reset.

If all tracks of the video floppy 1 are blank, no deviation is detected. At such time the magnetic head 2 is positioned at an absolute track position to perform recording.

In the processing illustrated in FIG. 4, the amount of deviation is set upon detecting the peak position of the signal recorded on the outermost side of the floppy. However, as indicated in (1-2) above, it is permissible to arrange it so that the amount of deviation is set upon detecting the peak position of the signal recorded on the inner most side of the floppy. In such case, once the track search processing has ended, the magnetic head 2 is again fed to the innermost track among the recorded tracks and the amount of deviation is detected by detecting the peak position.

An example of method (2) above will now be described.

Figure 5:
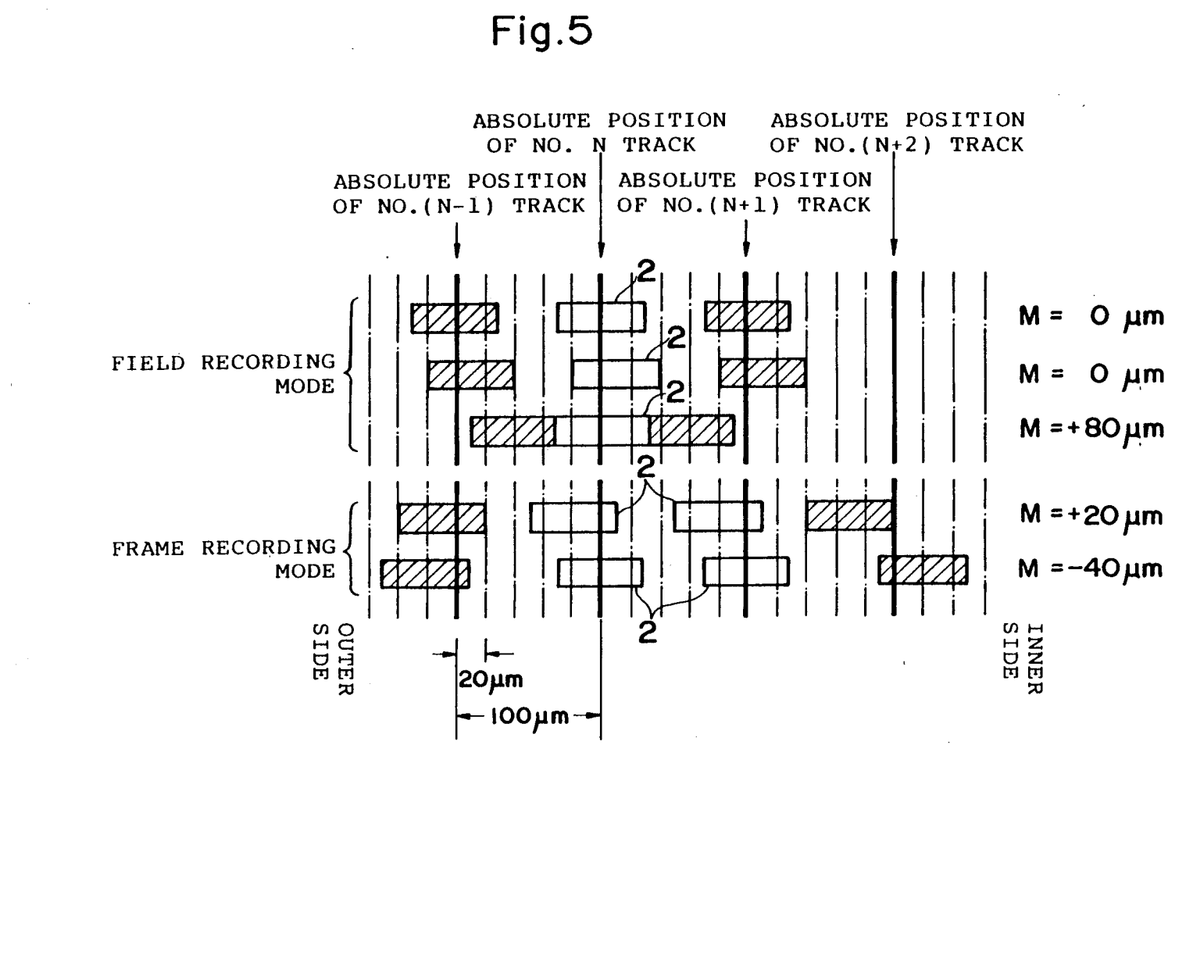

FIG. 5 illustrates the relationship between the positions of recorded tracks and the position of the magnetic head 2 correctly positioned upon taking into account the amount of deviation detected at the recorded tracks. The positions indicated by shading represent positions of recorded signals on recorded tracks. In the illustrated embodiment, the width of the magnetic head 2 is taken to be 60 μm, which is the same as the track width.

With a still video camera, as set forth above, it is possible to perform field recording, in which one field of a still video signal is recorded on one track by one magnetic head, and frame recording, in which one frame of a video signal of two fields is recorded on two mutually adjacent tracks by two magnetic heads.

In the case of field recording, recording is possible if the track to be recorded on has a blank area with a width of more than 60 μm. If the width is less than 60 μm, the recorded signal on a neighboring recording track will be overlapped.

In the case of frame recording, the spacing between the two magnetic heads 2 is equivalent to the width of the guard band. Therefore, it is required to have a blank area of a width greater than the following: (width of magnetic head) ×2+(spacing between magnetic heads) (namely 60 μm×2+40 μm=160 μm). If frame recording is performed at the position of an area whose width is less than the above, then part of the signal recorded on a neighboring track will be overlapped.

Accordingly, the peak positions of tracks neighboring, on radially inner and outer sides, the track to be recorded on are detected. The No. N track in the field recording mode and the No. N and (N+1) tracks in the frame recording mode are the tracks to be recorded on. The amount of deviation between the detected peak position of a track and the absolute track position of this track is detected for each track. It is assumed here that a recorded signal on a recorded track in FIG. 5 possesses a width 30 μm to the left and right of the center of the peak position.

Deviation in a direction which approaches the track to be recorded on is taken as being a positive deviation, and deviation in a direction away from the track to be recorded on is taken as being a negative deviation. The more the recorded signal on a neighboring track approaches the track to be recorded on, the positive deviation is greater and the range of the recordable area at the track to be recorded on is narrower. Also, when the sum M of the deviations of the neighboring tracks on both sides exceeds the sum (+80 μm) of the widths of the guard bands on both sides of the track to be recorded on, the above-described overlapping of the recorded signal will occur in both the field recording case and the frame recording case. Accordingly, M=+80 μm is the limit of the recordable condition.

If the recordable condition mentioned above is satisfied, the magnetic head 2 is positioned at a location intermediate the detected peak positions of the tracks neighboring, on the radially inner and outer sides, the track to be recorded on. This makes it possible to perform recording upon providing guard bands (a case is possible in which the guard band width is 0) equal in width to each other on both sides of the track to be recorded on.

If a track neighboring a track to be recorded on is blank, the amount of deviation is taken as being zero. That is, the absolute track position is taken as being a dummy peak position. If a deviation is found in track search processing, it is permissible to adopt the amount of this deviation as the amount of deviation of a neighboring blank track.

Figure 6:
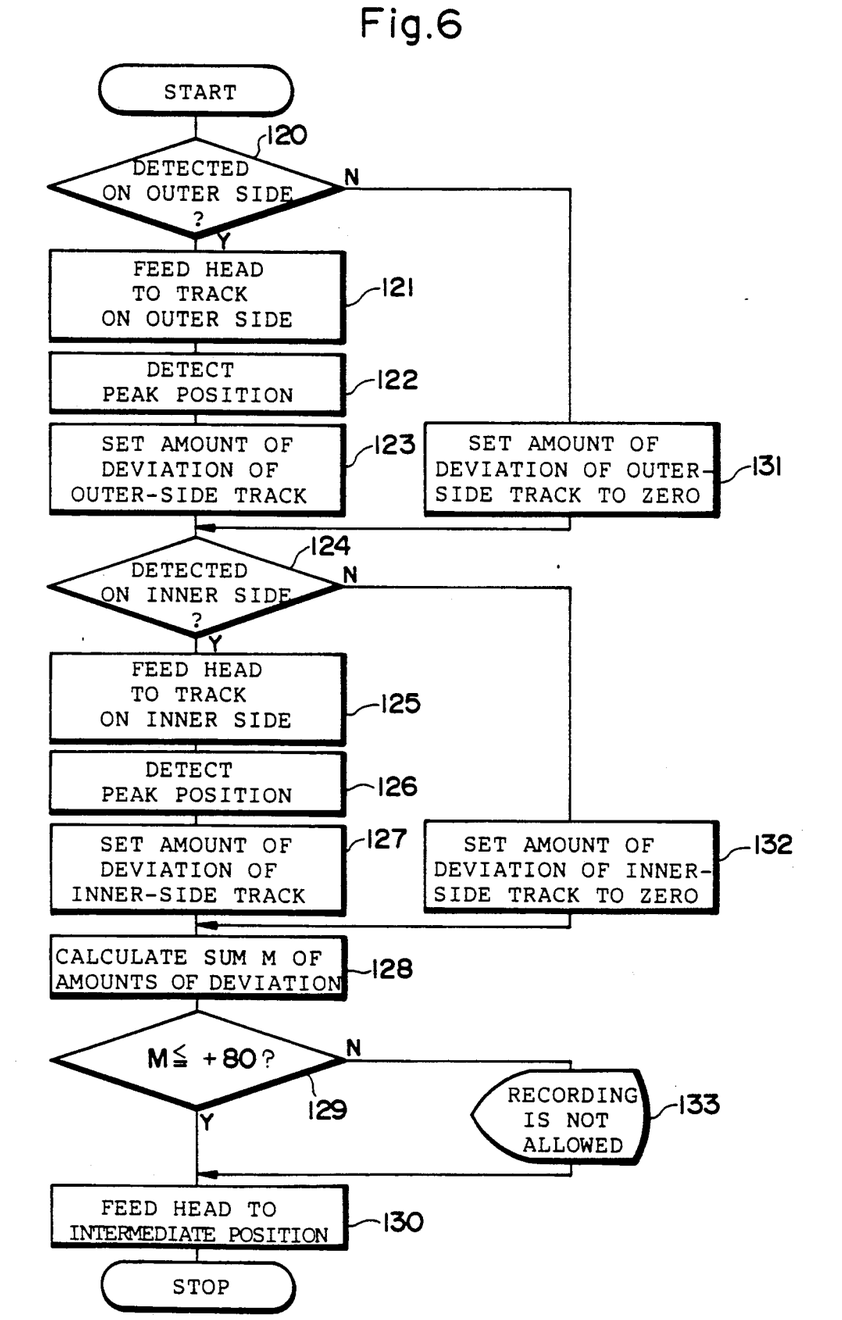

FIG. 6 illustrates the procedure of magnetic head positioning processing in accordance with the above-described approach.

Step 120 of this flowchart calls for a determination, which is based on the track map preserved in the memory of the recording controller 70, as to whether a track neighboring, on the radially outer side, a track to be recorded on is an already recorded track. If this track is an already recorded track, the magnetic head 2 is fed to the track which is the radially outward track of the track to be recorded on (step 121). Peak position detection processing of the envelope level at this track is performed at step 122. This is followed by calculating the difference between the detected peak position and the absolute track position of this track, namely the amount of deviation (positive or negative) of the track on the radially outer side, and setting the result in a memory or register at step 123. If the track on the radially outer side is blank, then zero is set as the amount of deviation at step 131.

Processing the same as in steps 120-123 and 131 is performed also with regard to the neighboring track on the radially inner side of the track to be recorded on, and the amount of deviation (positive, negative or zero) of the neighboring track on the radially inner side is set (steps 124, 125, 126, 127 and 132).

The amount of deviation of the radially outward neighboring track and the amount of deviation of the radially inward neighboring track are added and the sum M of the deviations is obtained at step 128. If the sum M of the deviations is less than the aforementioned +80 μm (YES at step 129), then enough spacing is provided to allow recording without causing recorded-signal overlap of neighboring tracks at the track to be recorded on. As a result, recording is possible. Accordingly, by using the peak positions or amounts of deviation of the neighboring tracks, an intermediate position midway between the peak positions of the neighboring tracks is calculated and the magnetic head 2 is positioned by feeding the magnetic head 2 to this intermediate position (step 130). When the sum M of the deviations is greater than the aforementioned +80 μm (NO at step 129), recorded signal overlap will occur if recording proceeds as is, or part of a neighboring track will be erased when erasure is performed. Accordingly, the display device 21 is made to display the fact that recording (erasure) is not allowed (step 133). For the time being, the magnetic head 2 is fed to a position intermediate the peak positions of the neighboring tracks on the radially inner and outer sides (step 130). Whether or not recording is to be performed is left up to the operator. Of course, it is permissible to forego feeding of the magnetic head 2 to the abovementioned intermediate position and prohibit the recording (erasure) function.

As many apparently widely different embodiments of the present invention can be made without departing from the spirit and scope thereof, it is to be understood that the invention is not limited to the specific embodiments thereof except as defined in the appended claims.

What is claimed is:

1. A magnetic recording apparatus comprising:
   a head feed device for feeding a magnetic head diametrically of a rotating magnetic recording medium having a plurality of concentric tracks;
   an envelope detecting circuit for detecting an envelope of a read signal obtained from the magnetic head;
   peak position detecting means for detecting a peak position of the envelope;
   position deviation detecting means for detecting an amount of deviation of a peak position of an envelope of a recorded signal, which has been recorded on at least one predetermined track, from an absolute track position of said one predetermined track; and
   positioning control means for causing, when recording is performed on a designated track, said head feed device to position the magnetic heat at an absolute track position of the designated track if the amount of deviation of the peak position fails to be detected and at an adjusted track position, which is determined by correcting with the amount to deviation from the absolute track position of the designated track, if the amount of deviation of the peak position is detected.

2. The magnetic recording apparatus according to claim 1, further comprising:
   track search processing means for determining whether each of said tracks on the magnetic recording medium are recorded tracks or blank tracks and storing the results of the determination; and
   track deviation detecting means for detecting said amount of deviation with regard to a predetermined recorded track and storing said amount of deviation detected thereby.

3. A method of feeding a magnetic head diametrically of a magnetic recording medium provided with a plurality of concentric track for positioning the magnetic head of a designated track, comprising the steps of:
   (a) detecting a peak position of an envelope of a recorded signal that has been recorded on at least one predetermined track;
   (b) detecting an amount of deviation of the peak position from an absolute track position of said one predetermined track;
   (c) causing the magnetic head to be positioned at the absolute track position of the designated track, when recording is to be performed on said designated track, if the amount of deviation fails to be detected;
   (d) causing the magnetic head to be positioned at an adjusted track position, which is determined by correcting with the amount of deviation from the absolute track position of the designated track, if the amount of deviation of the peak position is detected; and
   (e) stopping the magnetic head at the adjusted track position if the amount of deviation of the peak position is detected.

4. The method according to claim 3, further comprising the steps of:
   (f) determining whether each of said tracks on the magnetic recording medium are recorded tracks or blank tracks by a track search processing;
   (g) preserving the results from said step (f);
   (h) detecting said amount of deviation with regard to a predetermined recorded track; and
   (i) preserving the detected amount of deviation from said step (h).

5. The method according to claim 3, wherein the amount of deviation of a recorded track neighboring a track to be recorded on is detected whenever recording processing is performed.

6. The method according to claim 5, further comprising the steps of:
   (j) detecting the amount of deviation of each of two tracks neighboring, on both sides, a track to be recorded on; and
   (k) positioning the magnetic head at a position intermediate the neighboring tracks based on the detected amount of deviation at said step (j).

7. The method according to claim 6, wherein the amount of deviation is zero in a case where a neighboring track is a blank track.

8. A method of feeding a magnetic head diametrically of a magnetic recording medium having a plurality of concentric tracks for positioning the magnetic head on a designated track, comprising the steps of:
   (a) detecting a peak position of an envelope of a recorded signal that has been recorded on at least one predetermined track;
   (b) detecting an amount of deviation of the peak position from an absolute track position of said one predetermined track;
   (c) detecting the amount of deviation of the peak position of a recorded track neighboring a track to be recorded on whenever recording processing is performed;
   (d) positioning the magnetic head at the absolute track position of the designated track, when recording is to be performed on said designated track if an amount of deviation fails to be detected at said steps (b) and (c);
   (e) positioning the magnetic head at an adjusted track position, which is determined by correcting with an amount of deviation from the absolute track position of the designated track and the recorded track neighboring the track to be recorded on, is an amount of deviation of the peak position is detected at said steps (b) and (c); and
   (f) stopping the magnetic head at the adjusted track position if an amount of deviation is detected at said steps (b) or (c).

9. The method according to claim 8, further comprising the steps of:
   (g) determining whether each of said tracks on the magnetic recording medium are recorded tracks or blank tracks by a track search processing;
   (h) preserving the results from said step (g);
   (i) detecting said amount of deviation with regard to a predetermined recorded track; and
   (j) preserving the detected amount of deviation from said step (i).

10. The method according to claim 8, further comprising the steps of:
(k) detecting the amount of deviation of each of two tracks neighboring, on both sides, a track to be recorded on; and
(l) positioning the magnetic head at a position intermediate the neighboring tracks based on the detected amount of deviation at said step (k).

11. The method according to claim 10, wherein the amount of deviation is zero in a case where a neighboring track is a blank track.

12. A method of feeding a magnetic head diametrically of a magnetic recording medium having a plurality of concentric tracks for positioning the magnetic head on a designated track, comprising the steps of:
(a) detecting a peak position of an envelope of a recorded signal that has been recorded on at least one predetermined track;
(b) detecting an amount of deviation of the peak position from an absolute track position of said one predetermined track;
(c) detecting the amount of deviation of the peak position of a recorded track neighboring a track to be recorded on whenever recording processing is performed;
(d) detecting the amount of deviation of each of two tracks neighboring, on both sides, a track to be recorded on;
(e) positioning the magnetic head at the absolute track position of the designated track, when recording is to be performed on the designated track if an amount of deviation fails to be detected at said steps (b)-(d);
(f) positioning the magnetic head at an adjusted track position, which is determined by correcting with the amount of deviation from the absolute track position of the designated track and the recorded track neighboring the track to be recorded on, if an amount of deviation of the peak position is detected at said steps (b) and (c);
(g) positioning the magnetic head at a position intermediate the neighboring tracks based on the detected amount of deviation at said step (d); and
(h) stopping the magnetic head at the adjusted track position if an amount of deviation is detected at said steps (b) and (c).

13. The method according to claim 12, further comprising the steps of:
(i) determining whether each of said tracks on the magnetic recording medium are recorded tracks or blank tracks by a track search processing;
(j) preserving the results from said step (i);
(k) detecting said amount of deviation with regard to a predetermined recorded track; and
(l) preserving the detected amount of deviation from said step (k).

14. The method according to claim 13, wherein an amount of deviation is zero in a case where a neighboring track is a blank track.

* * * * *